May 2, 1933. W. L. ENGHAUSER 1,906,953
METHOD OF FORMING MANIFOLDS
Original Filed Feb. 20, 1929
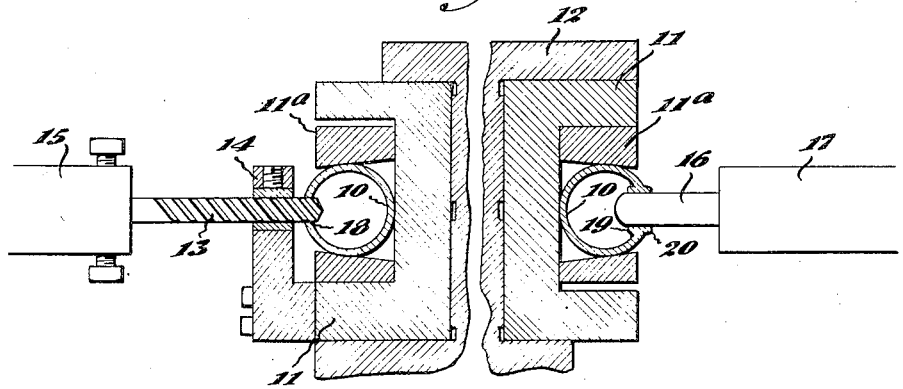
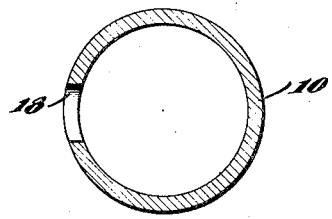
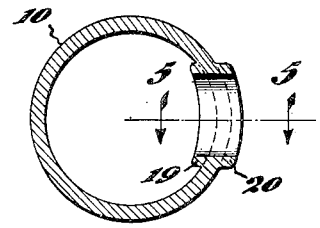
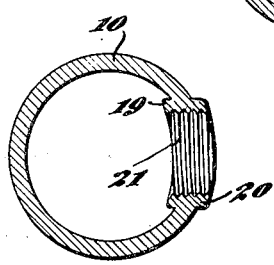
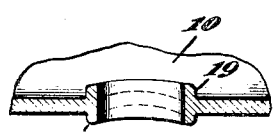
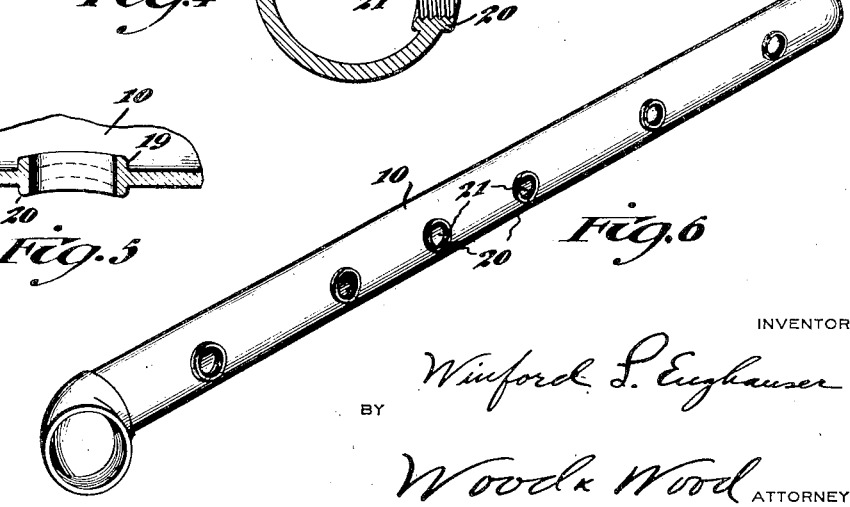
INVENTOR
Winford L. Enghauser
BY
Wood & Wood ATTORNEYS Patented May 2, 1933

1,906,953

UNITED STATES PATENT OFFICE

WINFORD L. ENGHAUSER, OF LEBANON, OHIO

METHOD OF FORMING MANIFOLDS

Original application filed February 20, 1929, Serial No. 341,467. Divided and this application filed June 2, 1931. Serial No. 541,653.

This invention relates to an improved method of manufacturing pipe manifolds and is particularly directed to a method of forming nipple receiving apertures or tap holes in manifolds for use on gas stoves and the like and is divisional of Patent No. 1,813,152, issued July 7, 1931, filed February 20, 1929. In formation of these manifolds, it is preferable to use a standard gas pipe, which pipe has a relatively thin wall. The fittings or nipples are screw-threaded into the walls of the pipe. The connections of the nipples or fittings to the manifold must be gas tight and for this reason it is desirable to have the openings through the wall of considerable length for greater bearing and increased thread length. The normal thickness of the wall of the standard pipe is insufficient for the formation of the necessary number of threads in a bore therethrough for a positively rigid connection of the nipple and a gas tight joint.

It is, therefore, the object of this invention to provide a method of forming tap holes in which the bores are of increased length over the normal or standard pipe wall thickness for increasing the bearing for the nipple and making it possible to provide an increased number of threads. It is furthermore provided that the ends of the bosses formed by this method of increasing the length of the tap bores are approximately squared or not as rounded as the bore ends provided by drilling directly through the thin wall of the pipe. This ordinarily approximate squaring permits easier starting of the tool for the thread cutting operation as well as greater ease in starting the nipples into the threaded bore due to the provision of a more continuous thread. Moreover the joint is stronger when the threads are less broken.

Other objects and certain advantages will be more fully apparent from a description of the accompanying drawing, in which:

Figure 1 is a diagrammatic view illustrating manifold pipes secured in a work holder, whereby the operation of initially drilling the manifold is performed at one side of the work support and the tap bore lengthening operation is performed at the opposite side.

Figure 2 is an enlarged transverse section through a pipe manifold illustrating the same after the operation of drilling has been performed.

Figure 3 is a sectional view taken similar to Figure 2, but showing the tap bore after it has been lengthened.

Figure 4 is a view taken similar to Figure 3 but illustrating the threads applied to the tap bore.

Figure 5 is a sectional view taken on line 5—5, Figure 3, further illustrating the lengthened bore prior to threading.

Figure 6 is a perspective view of the manifold after the operations of tap bore lengthening and threading.

The tap holes of this invention are formed of increased bore length by means of a spinning or rapidly rotating swaging tool. For centering the spinning tool at the start it has been found desirable to first drill the wall of the manifold prior to the spinning tool operation, this aiding in the centering of the tool and lessening the possibility of damage to the spinning tool which might result due to the length of an operation of swaging the relatively greater mass. Moreover, it has also been found that when the aperture has been drilled to a predetermined diameter which is carefully calculated, based on the difference in diameter between the drill and the spinning tool, the proper amount of metal to form a boss or a flange of a given length and thickness is then acted on by the spinning or swaging tool.

It will be understood, however, that the initial operation of drilling is preferable although it may not be performed, depending upon the hardness of the pipe and the form of aperture or tap bore desired. For the initial operation of drilling, the pipe may be supported in any desired manner, a preferred apparatus being disclosed in the co-pending application Serial Number 341,467 which relates to a machine for carrying out this method.

As shown diagrammatically in Figure 1, the pipe 10 is secured between the clamping elements 11ᵃ of a work holding device 11 within a work holder 12 of the reversible type having duplicate work holding devices at respectively opposite sides, whereby the holder may be upset after the drilling operation to dispose the drilled pipe for the spinning or swaging operation on the opposite side.

The drill 13 may be of any conventional type and is suitably supported toward its outer end for an accurately centered drilling operation by means of a centering bracket 14 and is socketed within a spindle 15. The drawing illustrates a single drill in operation but it will be understood that a plurality of drills may be used to drill a plurality of openings 18 simultaneously. This also applies to the spinning tools.

Each spinning tool 16, socketed in a spindle 17, has a rounded end for ease and accuracy in centering the same as it is passed into the particular drill hole. The spinning tool, as it is passed through the wall of the manifold, is rotating at a high rate of speed and immediately upon contact therewith heats the metal about the drill hole to a forming heat and swages or spins the same partly toward the interior and partly toward the exterior of the manifold. Since the metal is heated and the swaging or deforming takes place rapidly under centrifugal force, there is little tendency to depress the wall of the pipe inwardly and a smooth integral sleeve-like portion, including inwardly and outwardly formed bosses 19 and 20 for the opening, is provided. The rotating tool of highly hardened steel is passed through or penetrates the wall of the pipe with substantially no resistance since the friction between the tool and metal induces heat almost instantly and the tool melts its way through either the blank wall or the previously apertured wall. No heavy inward or longitudinal tool feeding pressure is necessary since the tool passes easily through the softened wall and one pass of the tool is sufficient for the formation of the improved tap hole or sleeve.

As stated, the metal is heated to a red heat by the spinning tool contacting the metal rotating at high speed which result occurs best due to the friction induced by a dry contact. The drilled hole (see Figure 2) is of smaller diameter than the predetermined size of the finished tap hole and the difference between these diameters is computed to furnish enough metal mass for a sleeve of sufficient length.

More specifically, describing the action of the spining tool, there is very little longitudinal pressure, the tendency of the spinning action being to displace or force the metal radially or tangentially from the spinning tool. This permits the back spinning of the metal in the formation of an outer flange. The metal is easily spun and spread along the tool in the formation of the bosses in both directions.

Since the swaging pressures applied are equal in all directions, that is transversely and longitudinally as induced radially or centrifugally of the spinning tool, the swaging action takes place unevenly as in the following manner in view of the fact that a curved metal plate is being acted upon. There is displacement of more metal along the transverse edges of the opening on the exterior of the pipe than on the longitudinal edges, while the opposite is true as to the interior of the pipe. This will be apparent from Figures 3 and 5. This results in the formation of flanges which have approximately squared ends or ends which are not formed on the same curve as the curvature of the wall being of a curve in between this curve and a straight line. The building up or swaging of the metal to the transverse sides of the flanges exteriorly and the longitudinal sides of the flanges internally occurs largely because there is less support at these points due to the curvature of the wall and less resistance to the swaging action of the tool. The tool having a straight portion traversing the pipe wall forms a straight finished bore for threading.

After the manifolds are taken from the machine, the tap openings are screw-threaded as shown at 21 in Figure 4 and it is apparent therefrom that a greater number of threads may be applied to the sleeve-like tap hole than could be applied to the normal wall thickness of the pipe. Moreover, the ends of the flanges or the sleeve being nearer a straight or squared condition, there is greater ease in starting the threads and there are less broken threads than there would be if the threads were applied to an opening through the normally curving wall of the pipe or a boss sharply curved at its end.

Having described my invention, I claim:

1. The process of forming a sleeve opening in thin wall malleable iron pipe consisting of passing a rapidly rotating spinning tool through the wall thereof for simultaneously frictionally generating red heat in the metal of the pipe adjacent the tool, thereby causing the metal to become plastic, and displacing the metal in both directions along the tool.

2. The process of forming a sleeve opening in thin wall malleable pipe consisting of initially forming an aperture in the fall of the pipe and thereafter passing a blunt end straight rapidly rotating spinning tool of greater diameter than the aperture through the aperture for simultaneously frictionally generating red heat in the metal of the pipe adjacent the tool rendering the metal plastic and displacing the metal in both directions along the tool.

3. The process of forming a sleeve opening in thin wall malleable pipe consisting of passing a rapidly rotating spinning tool through the wall thereof for simultaneously frictionally generating a red heat in the metal of the pipe adjacent the tool, rendering the metal plastic and displacing the metal in both directions along the tool forming a sleeve opening having substantially squared ends.

4. The process of forming in thin wall malleable pipe a sleeve of a length greater than the thickness of the pipe, the process comprising, melting an opening in the wall of said pipe with an elongated blunt tool moving longitudinally along its own axis and in a state of rotative motion adapted to generate red heat in the metal adjacent the tool.

5. The process of forming in thin wall malleable pipe a sleeve of a length greater than the thicknes of the pipe, the process comprising, penetrating the wall of said pipe with an elongated blunt tool moving longitudinally on its own axis, and possessed of a rotative motion adapted to soften the pipe metal about the tool.

6. The process of forming in thin wall malleable pipe a sleeve of a length greater than the thickness of the pipe, the process comprising, rendering the metal of the pipe wall plastic and displacing it simultaneously by means of an elongated blunt tool moving longitudinally on its own axis and generating red heat in the metal about the tool upon contact with the pipe by virtue of its own rotative motion.

7. The process of forming in thin wall pipe a sleeve of a length greater than the thickness of the pipe, the process comprising, penetrating the pipe with an elongated tool moving longitudinally on its own axis and at a high speed rotatively and generating red heat by friction in the metal adjacent the tool.

8. The process of forming in thin wall pipe a sleeve of a length greater than the thickness of the pipe, the process comprising, penetrating the pipe wall with an elongated tool moving longitudinally on its own axis and possessed of sufficient rotative motion to melt its way therethrough.

In witness whereof, I hereunto subscribe my name.

WINFORD L. ENGHAUSER.